United States Patent [19]

Wilde

[11] 4,258,767
[45] Mar. 31, 1981

[54] TIRE AND WHEEL RIM ASSEMBLIES

[75] Inventor: Ralph Wilde, Semele, Near Leamington, England

[73] Assignee: Dunlop Limited, London, England

[21] Appl. No.: 19,912

[22] Filed: Mar. 12, 1979

[30] Foreign Application Priority Data

Mar. 28, 1978 [GB] United Kingdom .............. 12068/78

[51] Int. Cl.³ ............................................. B60C 17/00
[52] U.S. Cl. .............................. 152/158; 152/330 RF;
152/330 L; 308/110
[58] Field of Search ............. 152/158, 330 RF, 330 L,
152/400–402; 305/14; 301/39 T, 95–98; 184/45
R, 85, 100, 102, 65; 308/109, 110; 222/541

[56] References Cited

U.S. PATENT DOCUMENTS

| 3,682,219 | 8/1972 | Lindley | 152/330 RF UX |
| 3,961,728 | 6/1976 | Harris | 152/330 RF X |
| 4,081,014 | 3/1978 | Searle | 152/330 RF X |
| 4,116,505 | 9/1978 | Stahlecker | 184/85 X |

FOREIGN PATENT DOCUMENTS

| 2643117 | 4/1977 | Fed. Rep. of Germany | 152/158 |
| 1,375,415 | 11/1974 | United Kingdom | 152/158 |
| 1522028 | 8/1978 | United Kingdom | 152/158 |

Primary Examiner—John T. Goolkasian
Assistant Examiner—Thomas E. Bokan
Attorney, Agent, or Firm—Stevens, Davis, Miller & Mosher

[57] ABSTRACT

A pneumatic tire and wheel rim assembly of the type in which support means extends circumferentially around the rim between the bead seats to support the tire when in a deflated condition.

The support means is rotatable relative to the rim when the tire is in a deflated condition and lubrication means is provided to release lubricant to facilitate said relative rotation.

The lubrication means comprises a sealed container located in a recess in the radially inner surface of the support means which ruptures to release lubricant between the radially inner surface of the support means and a confronting running surface on the rim when the tire is in a deflated condition.

18 Claims, 3 Drawing Figures

TIRE AND WHEEL RIM ASSEMBLIES

This invention concerns improvements in or relating to support means for use in pneumatic tire and wheel rim assemblies in which the support means is arranged and adapted to support the tire when the tire is in a deflated condition.

According to the present invention there is provided pneumatic tire and wheel rim assembly comprising a pneumatic tire having a tread, a pair of sidewalls and a pair of axially spaced beads, a wheel rim having a pair of axially spaced bead seats each of which locates a respective one of the tire beads, and support means arranged and adapted to support the tire when in a deflated condition. The support means extends circumferentially around the rim between the bead seats and is rotatable relative to the rim when the tire is in a deflated condition, and lubrication means are arranged and adapted to release lubricant so as to facilitate rotation of the support means relative to the wheel rim.

The support means extends radially outwards from the wheel rim beyond the radially outermost point of the bead retaining flanges of the wheel rim and is spaced from the radially inner surface of the tread when the tire is inflated. Following complete or partial deflation of the tire sufficient to cause the radially inner surface of the tire to contact the radially outer surface of the support means, the support means becomes load-carrying and rotates relative to the wheel rim to accommodate the difference in circumference between the tire and the support means and thereby minimize the generation of heat and damage to the tire and insert.

Preferably the lubrication means is arranged so that the lubricant is released between the radially inner surface of the support means and a confronting running surface on the wheel rim. In this way undesirable distribution of the lubricant over the entire radially inner surface of the tire is substantially avoided.

Preferably the lubricant is only released when the support means becomes load-carrying i.e. following complete or partial deflation of the tire sufficient to cause the radially inner surface of the tread to contact the radially outer surface of the support means.

Conveniently the lubrication means comprises a sealed container in which the lubricant is contained, the lubricant normally being a liquid at ambient temperatures. Preferably the container is located in a recess in the radially inner surface of the support means and the container has a weakened portion adapted to rupture when the support means becomes load-carrying, thus allowing release of the lubricant. The weakened portion may comprise a radially inwardly directed nipple or projection which engages the confronting running surface on the rim and which is ruptured when the support means becomes load-carrying. Rupture of the weakened portion may occur simultaneously with the support means becoming load-carrying. Alternatively rupture may occur following relative rotation between the support means and the wheel rim in which case the support means is preferably restrained against rotation relative to the rim until the support means becomes load-carrying, for example by ensuring the support means is a close fit on the wheel rim. The frictional forces between the projection and the confronting running surface on the rim on relative rotation between the support means and the rim may be sufficient to rupture the weakened portion. Alternatively the projection may be located in a hole or groove in the running surface on the rim so that the projection is sheared off following said relative rotation.

The container may be resiliently biassed in a radially inwards direction, for example by a compression spring, to ensure the projection engages the running surface on the rim.

The support means may be of any type known to those skilled in the art which is rotatably mounted on the rim so that slippage occurs between the radially inner surface of the support means and the rim.

Preferably the support means is of the type disclosed in U.K. Patent Specification No. 1,375,415 and comprises a plurality of elongate arcuate members attached end-to-end to form an annular hoop. The members may be made of metal, for example aluminium, solid rubber, polyurethane, high density polyethylene or any combination of these materials in sandwich form.

Preferably the support means is axially located on the wheel rim.

The running surface on the rim for the radially inner surface of the support means may comprise the surface of the wheel rim itself. Alternatively the running surface may comprise the radially outer surface of a member interposed between the rim and the support means.

The radially inner surface of the support member and/or the running surface on the rim may be coated with a low friction material, for example poly-tetra-fluoro-ethylene (P.T.F.E.).

The rim may have a well or may be well-less. Furthermore the rim may be a single component or multi-component, for example the rim may have a detachable flange or be of the split-rim type.

The pneumatic tire may be of the tubeless type and of either cross-ply or radial-ply construction.

The invention will now be described in more detail, by way of example only, with reference to the accompanying drawings wherein.

Figure 1:
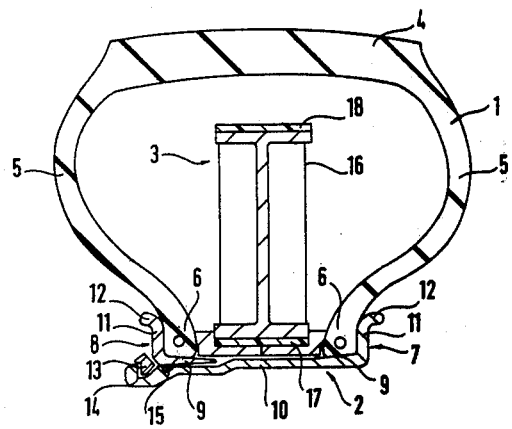
FIG. 1 is a cross-section through a first embodiment of a pneumatic tire and wheel rim assembly according to the invention.
Figure 2:
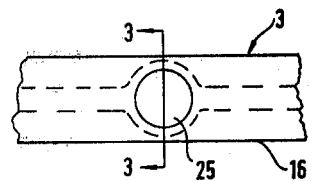
FIG. 2 is a plan view of the support means shown in FIG. 1.

The assembly shown in FIG. 1 of the accompanying drawings comprises a radial ply tire 1 mounted on a wheel rim 2 and support means 3 for supporting the tire when in a deflated condition.

The tire 1 has a tread 4, a pair of sidewalls 5 and a pair of axially spaced reinforced tire beads 6.

The rim 2 comprises a main rim part 7 and a detachable flange 8 which define a pair of axially spaced bead seats 9 for the tire beads 6. An annular rim portion 10 extends between the bead seats 9 and the radially outer edge of each bead seat leads to a radially outwardly directed bead retaining flange 11 which terminates in a rolled over radius 12. The flange 8 is secured to the rim part 7 by an annular locking ring 13 located in an annular locking ring groove 14 in the main rim part 7. The tire is inflated via the usual valve (not shown) and an annular sealing ring 15 provided between the rim part 7 and the flange 8 renders the assembly air-tight.

The support means 3 comprises a plurality of rigid support members 16 (one only shown) connected end-to-end by elongate links pivotally mounted at their end regions on pivot pins carried by the members 16. Each support member 16 is similar and is of arcuate profile in side elevation so that the assembled support members 16 form an annular hoop which extends circumferentially around the rim portion 10.

The radially inner and outer surfaces of the support means are each coated with a layer 17 and 18 respectively of P.T.F.E.

A channel section member 19 made of aluminium extends circumferentially around the radially outer surface of the rim and across the axial width of the rim between the bead seats 9 to retain the beads 6 on the associated bead seat 9. The support means 3 is located in the channel of the member 19 and the side portions of the member form abutment shoulders 20 which prevent movement of the support means 3 in an axial direction relative to the rim. The bottom surface of the channel of the member 19 provides a running surface 21 for the radially inner surface of the support means.

The support means 3 is held in place with respect to the rim 2 by the closeness of its fit in the member 19 which precludes any substantial relative rotation between the support means 3 and the rim 2 during normal rotation of the wheel assembly with the tire 1 inflated, but which permits relative rotation on deflation of the tire 1 resulting in the radially inner surface of the tire tread 4 coming into loadbearing contact with the radially outer surface of the support means 3.

Figure 3:
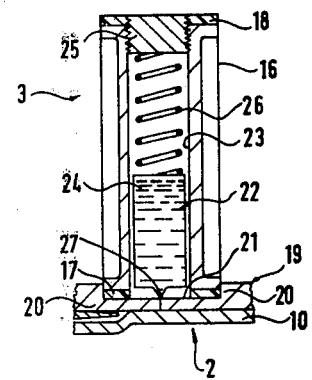
FIG. 3 is a section, to an enlarged scale, on the line 3—3 of FIG. 2.

As best shown in FIG. 3, lubrication means 22 for lubricating the interface between the radially inner surface of the support means 3 and the running surface 21 on the rim is located in a radially extending cylindrical bore 23 in one of the support members 16.

The lubrication means 22 comprises a cylindrical sealed container 24 containing a lubricant which is a liquid at ambient temperatures. The radially outer end of the bore 23 is closed by a removable plug 25 and the container 24 is resiliently biassed in a radially inwards direction by a compression spring 26 acting between the plug 25 and the container 24 so that a weakened portion of the container comprising a nipple 27 resiliently engages the running surface 21.

In normal use the inflated tire 1 remains clear of the radially outer surface of the support means 3 which rotates with the rim 2. However, upon complete or partial deflation sufficient to bring the radially inner surface of the tire tread 4 into contact with the radially outer surface of the support means the resulting frictional forces between the tire 1 and support means 3 are sufficient to overcome the frictional resistance to movement of the support means which rotates relative to the rim. The frictional forces generated between the nipple 27 and running surface 21 are sufficient to cause the nipple 27 to rupture, thus releasing the lubricant from the container 24. The lubricant is supplied directly to the interface between the radially inner surface of the support means and the running surface 21 and relative rotation between the support means and the rim ensures the lubricant is evenly distributed between the confronting surfaces thereby further reducing any frictional resistance betwween the confronting surfaces.

By containing the lubricant in a sealed container 24 which is adapted to rupture only when the support means 3 becomes load-carrying and which is arranged to supply the lubricant directly to the interface, undesirable distribution of the lubricant over the inner surface of the tire which could result in slippage occurring between the tire 1 and support means 3 is substantially avoided.

The invention is not restricted to the above-described embodiment which may be modified in a number of ways, for example the lubrication means may comprise a plurality of containers each containing lubricant and spaced circumferentially around the rim, preferably at uniform intervals. Where the support means comprises a plurality of arcuate support members each support member may have an associated container locatd in a recess in the radially inner surface of the support member.

The projection or nipple forming the weakened portion of the container may be located in an opening in the running surface so that the projection or nipple is sheared off when relative rotation occurs between the support means and the rim.

The running surface may be formed by the radially outer surface of the rim or of a member interposed between the rim and support means. The member may axially locate the support means as described or may simply comprise a layer of material, preferably having a low coefficient of friction, attached to the radially outer surface of the rim.

The support means may be of any type known to those skilled in the art which is rotatable relative to the rim to accommodate slippage between the deflated tire and rim.

The rim may have a well or may be well-less as described. The rim may comprise a single component or be multi-component, for example the rim may have a detachable flange as described or be of the split-rim type.

Having now described my invention—what I claim is:

1. A pneumatic tire and wheel rim assembly comprising a pneumatic tire having a tread, a pair of sidewalls and a pair of axially spaced beads, a wheel rim having a pair of axially spaced bead seats each of which locates a respective one of said tire beads, support means extending circumferentially around said rim between said bead seats for supporting said tire when in a deflated condition, said support means being rotatable relative to said rim when said tire is in a deflated condition and lubrication means carried by said support means for releasing lubricant between a radially inner surface of said support means and a confronting running surface on said rim when said support means becomes load bearing to facilitate rotation of said support means relative to said rim, said lubrication means being carried in a container in a recess open at one end leading to the confronting running surface on the rim and closed at the other end by a removable closure member, and means resiliently biasing the lubricant container towards the confronting running surface on the rim.

2. An assembly according to claim 1 wherein said lubrication means comprises a sealed container in which said lubricant is contained.

3. An assembly according to claim 2 wherein said container has a weakened portion which ruptures to release said lubricant when said support means becomes load-carrying.

4. An assembly according to claim 3 wherein said weakened portion comprises a projection in engagement with said running surface.

5. An assembly according to claim 4 wherein said projection is located in an opening in said running surface.

6. An assembly according to claim 1 wherein said lubricating means is located in a recess in said radially inner surface of said support means.

7. An assembly according to claim 6 wherein said recess is defined by a through bore extending between the radially inner and outer surfaces of said support means.

8. An assembly according to claim 1 in which lubrication means is a sealed container of liquid lubricant having an extended nipple exit portion directed toward said confronting running surface.

9. An assembly according to claim 1 wherein said running surface comprises the radially outer surface of said rim between said bead seats.

10. An assembly according to claim 1 wherein said running surface comprises the radially outer surface of a member interposed between said rim and said radially inner surface of said support means.

11. An assembly according to claim 1 wherein said running surface is coated with material having a low coefficient of friction.

12. An assembly according to claim 1 wherein said radially inner surface of said support means is coated with a material having a low coefficient of friction.

13. An assembly according to claim 1 including means for axially locating said support means on said rim.

14. An assembly according to claim 13 wherein said axial location means comprises a channel-section member extending circumferentially around said rim and said support means is located in the channel of said member.

15. An assembly according to claim 14 wherein said rim is well-less and said channel section member extends between said bead seats and contacts said beads to retain said beads on the associated bead seat.

16. An assembly according to claim 14 wherein said running surface comprises the bottom of said channel.

17. An assembly according to claim 1 wherein a radially outer surface of said support means is coated with a material having a low coefficient of friction.

18. An assembly according to claim 1 wherein said support means comprises a plurality of elongate arcuate members connected end-to-end to form an annular loop extending around said rim.

* * * * *